(12) United States Patent
Liao et al.

(10) Patent No.: US 11,175,551 B2
(45) Date of Patent: Nov. 16, 2021

(54) PIXEL ARRAY SUBSTRATE

(71) Applicant: Au Optronics Corporation, Hsinchu (TW)

(72) Inventors: Bo-Kai Liao, Hsinchu (TW);
Lung-Ling Tang, Hsinchu (TW);
Li-Chih Hsu, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 102 days.

(21) Appl. No.: 16/721,839

(22) Filed: Dec. 19, 2019

(65) Prior Publication Data

US 2021/0088860 A1 Mar. 25, 2021

(30) Foreign Application Priority Data

Sep. 25, 2019 (TW) ................................. 108134558

(51) Int. Cl.
*G02F 1/1362* (2006.01)
*G02F 1/1333* (2006.01)

(52) U.S. Cl.
CPC .. *G02F 1/136286* (2013.01); *G02F 1/133345* (2013.01)

(58) Field of Classification Search
CPC ...................... G02F 1/136286; G02F 1/133345
USPC ........................................................ 349/43
See application file for complete search history.

(56) References Cited

U.S. PATENT DOCUMENTS

| 8,466,999 | B2 | 6/2013 | Shiau et al. | |
| 2012/0069241 | A1* | 3/2012 | Shiau | G06F 1/1605 |
| | | | | 348/373 |
| 2016/0187750 | A1* | 6/2016 | Tang | G02F 1/136286 |
| | | | | 349/42 |

FOREIGN PATENT DOCUMENTS

| JP | H09190006 | 7/1997 |
| TW | 200813507 | 3/2008 |
| TW | I307426 | 3/2009 |
| TW | 201214361 | 4/2012 |
| TW | I371618 | 9/2012 |
| TW | I507777 | 11/2015 |

* cited by examiner

*Primary Examiner* — Nathanael R Briggs
*Assistant Examiner* — William D Peterson
(74) *Attorney, Agent, or Firm* — JCIPRNET

(57) ABSTRACT

A pixel array substrate includes a substrate, a plurality of pixel structures, a peripheral trace and a plurality of first patterns. The substrate has an active area and a peripheral area outside the active area. The plurality of pixel structures is disposed in the active area of the substrate. Each of the pixel structures includes a signal line, an active device electrically connected to the signal line and a pixel electrode electrically connected to the active device. The peripheral trace is disposed in the peripheral area of the substrate. A plurality of first patterns is disposed in the peripheral area of the substrate. Each of the first patterns includes a first trunk portion and at least one first branch portion crossed with the first trunk portion. The first trunk portion is electrically connected to the peripheral trace or the signal line of the pixel structure.

20 Claims, 11 Drawing Sheets

PIXEL ARRAY SUBSTRATE

CROSS-REFERENCE TO RELATED APPLICATION

This application claims the priority benefit of Taiwan application serial no. 108134558, filed on Sep. 25, 2019. The entirety of the above-mentioned patent application is hereby incorporated by reference herein and made a part of this specification.

BACKGROUND OF THE DISCLOSURE

1. Field of the Disclosure

The disclosure relates to a pixel array substrate.

2. Description of Related Art

Display panels are more and more widely applied in various fields, such as home audio-visual entertainments, public information display billboards, e-sports displays, and portable electronic products. In recent years, display panels are gradually further applied in the field of vehicles and wearable electronic products for example, rear-view mirrors for vehicles, instrument panels for vehicles, multi-function electronic watches/bracelets. Most of the displays on these electronic apparatus are free-form display panels with oval, circular, or other non-rectangular appearances. In a process of manufacturing a free-form display panel, a sealant needs to be coated along an edge of the free-form substrate. However, the sealant at a bending segment of the edge of the free form substrate is prone to deviation.

SUMMARY OF THE DISCLOSURE SUMMARY OF THE DISCLOSURE

An embodiment of the disclosure provides a pixel array substrate, so as to help monitor a deviation degree of a sealant and/or help coat a sealant accurately.

A pixel array substrate of the disclosure includes a substrate, a plurality of pixel structures, a peripheral trace and a plurality of first patterns. The substrate has an active area and a peripheral area outside the active area. The plurality of pixel structures is disposed in the active area of the substrate. Each of the pixel structures includes a signal line, an active device electrically connected to the signal line and a pixel electrode electrically connected to the active device. The peripheral trace is disposed in the peripheral area of the substrate. The plurality of first patterns is disposed in the peripheral area of the substrate. Each of the first patterns includes a first trunk portion and at least one first branch portion crossed with the first trunk portion. The first trunk portion is electrically connected to the peripheral trace or the signal line of the pixel structure.

A pixel array substrate of the disclosure includes a substrate, a plurality of pixel structures, a peripheral trace and a plurality of first patterns. The substrate has an active area, a peripheral area outside the active area, and an edge, where the edge of the substrate has a curve segment. The plurality of pixel structures is disposed in the active area of the substrate. Each of the pixel structures includes a signal line, an active device electrically connected to the signal line and a pixel electrode electrically connected to the active device. The peripheral trace is disposed in the peripheral area of the substrate, and has a curve segment, where the curve segment of the peripheral trace is disposed corresponding to the curve segment of the substrate. The plurality of first patterns is disposed in the peripheral area of the substrate, and arranged along the curve segment of the peripheral trace. Each of the first patterns includes a first trunk portion and at least one first branch portion crossed with the first trunk portion. The first trunk portion is electrically connected to the peripheral trace or the signal line of the pixel structure.

DESCRIPTION OF THE EMBODIMENTS

Reference is now made to exemplary embodiments of the disclosure in detail, and examples of the exemplary embodiments are illustrated in the accompany drawings. Whenever possible, same component symbols in figures and descriptions are used to represent same or similar parts.

It should be understood that, when a component of a layer, a film, an area, a substrate, or the like are referred to as being "on" another component or "connected to" another component, the component may be directly on the another component or connected to the another component, or an intermediate component may alternatively exist. On the contrary, when the component is referred to as being "directly on another component" or "directly connected to" another component, there is no intermediate component. As used in this specification, a "connection" may refer to a physical connection or an electrical connection. Moreover, an "electrical connection" or a "coupling" may mean that other components exist between two components.

Terms "about", "approximately", or "essentially" used in this specification include an average value within an acceptable deviation range of a specific value determined by a person of ordinary skill in the art and a value, considering a discussed measurement and a specific quantity (namely, a constrain of a measurement system) of deviations related to the measurement. For example, "about" may represent a deviation within one or more standard deviations of the value or within ±30%, ±20%, ±10%, or ±5%. Moreover, the terms "about", "approximately", or "essentially" used in this specification may be selected from a relatively acceptable deviation range or standard deviation based on an optical property, an etching property or other properties, and a standard deviation may not be applied to all properties.

Unless defined otherwise, all terms (including technical and scientific terms) used in this specification have the same meanings as a person of ordinary skill in the art of the disclosure generally understands. It needs to be further understood that, terms such as those defined in a commonly used dictionary should be interpreted as having meanings consistent with the meanings of the terms in the related art and in the context of the disclosure, and should not be interpreted as having ideal or excessively formal meanings, unless as specifically defined in this specification.

Figure 1:
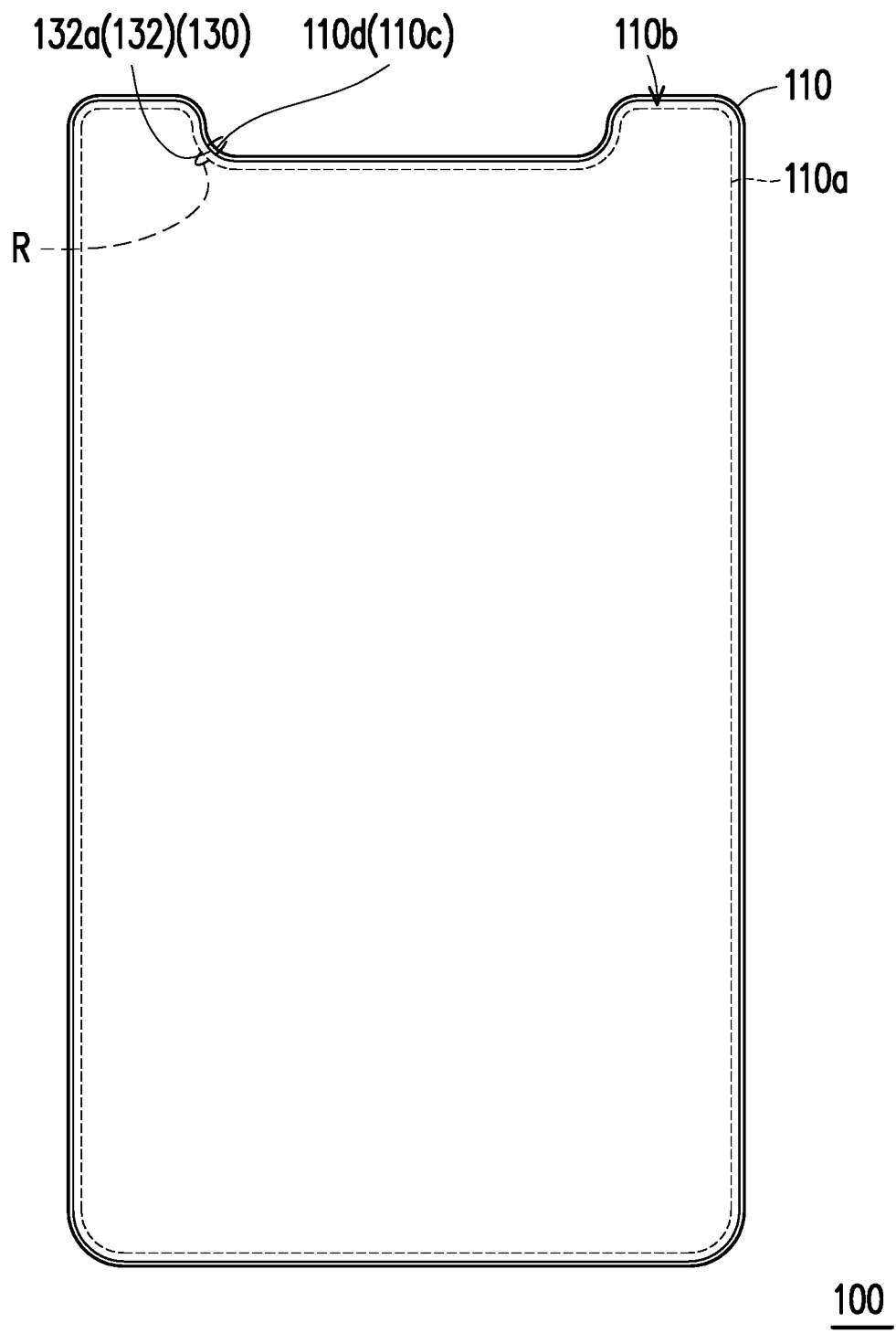
FIG. 1 is a schematic top view of a pixel array substrate according to an embodiment of the disclosure.

FIG. 1 is a schematic top view of a pixel array substrate according to an embodiment of the disclosure.

Figure 2:
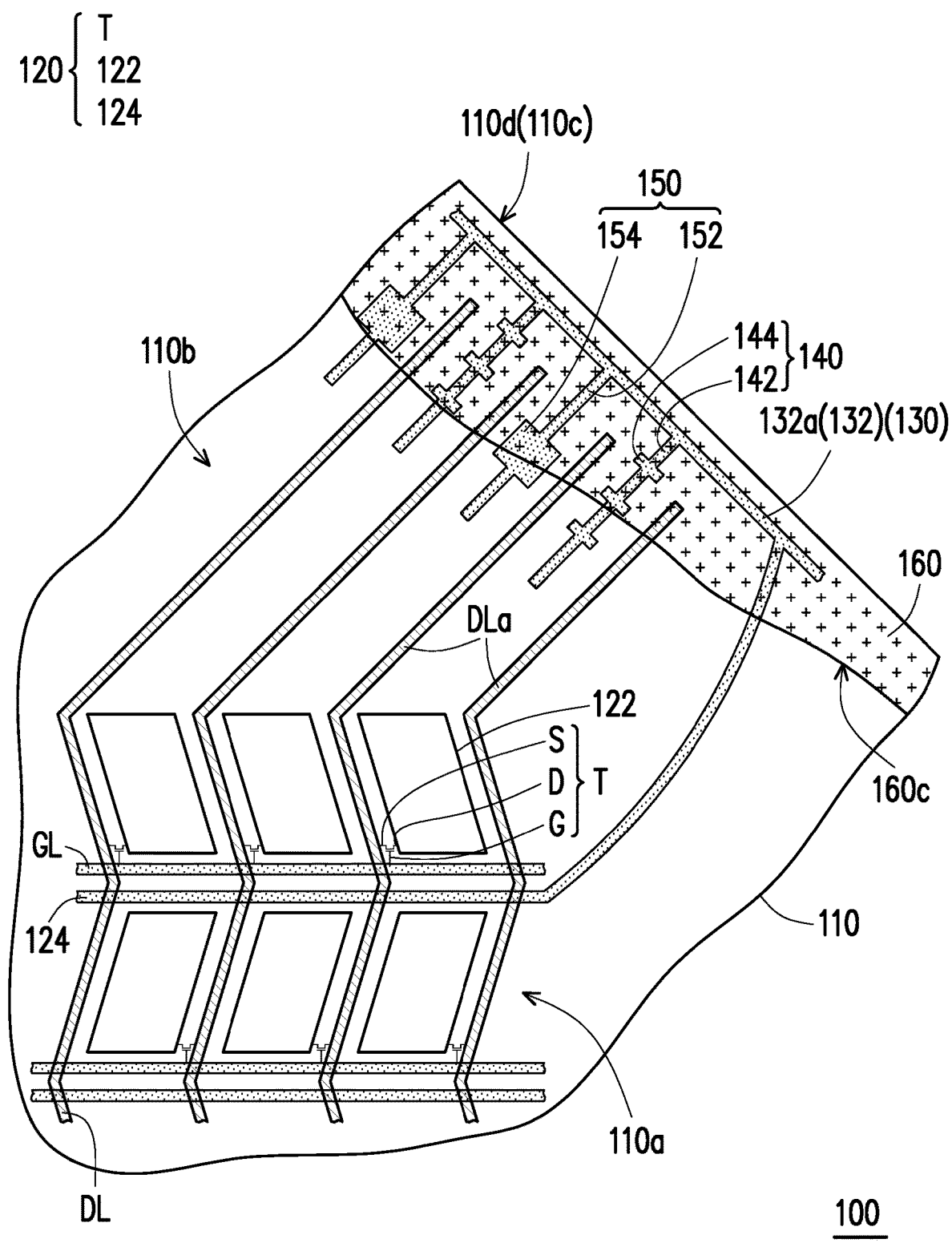
FIG. 2 is a partial enlarged view of a pixel array substrate 100 according to an embodiment of the disclosure.

FIG. 2 is a partial enlarged view of a pixel array substrate 100 according to an embodiment of the disclosure. FIG. 2 corresponds to a part R of FIG. 1.

FIG. 1 shows a substrate 110 and a peripheral trace 130 of the pixel array substrate 100, and omits other components of the pixel array substrate 100. The omitted other components of the pixel array substrate in FIG. 1 are show in FIG. 2.

Referring to FIG. 1 and FIG. 2, the pixel array substrate 100 includes a substrate 110. The substrate 110 has an active area 110a and a peripheral area 110b outside the active area 110a. For example, in the present embodiment, the substrate 110 may be a free-form substrate, and an edge 110c of the substrate 100 may include a curve segment 110d. However, the disclosure is not limited thereto. The substrate 110 may be a rectangular substrate according to other embodiments. In the present embodiment, materials of the substrate 110 may be glass, quartz, an organic polymer, or an opaque/reflective material (for example, a wafer, a ceramic, or other applicable materials), or other applicable materials.

The pixel array substrate 100 includes a plurality of pixel structures 120, disposed in the active area 110a of the substrate 110. Each of the pixel structures 120 includes a signal line DL, an active device T electrically connected to the signal line DL and a pixel electrode 122 electrically connected to the active device T. For example, in the present embodiment, the active device T may include: a thin film transistor, having a source S, a drain D, and a gate G. The pixel electrode 122 is electrically connected to the drain D of the thin film transistor. The signal line DL is electrically connected to the source S of the thin film transistor, and the signal line DL may be referred to as a data line. Each of the pixel structures 120 further includes a signal line GL crossed with the signal line DL, where the signal line GL is electrically connected to the gate G of the thin film transistor, and the signal line GL may be referred to as a gate line.

The pixel array substrate 100 includes a peripheral trace 130, disposed in the peripheral area 110b of the substrate 110. For example, in the present embodiment, a main portion 132 of the peripheral trace 130 extends along the edge 110c of the substrate 110, and the main portion 132 of the peripheral trace 130 has a curve segment 132a, where the curve segment 132a of the peripheral trace 130 is disposed corresponding to the curve segment 110d of the edge 110c of the substrate 110.

Each of the pixel structures may further include a shared electrode 124. In the present embodiment, the peripheral trace 130 located in the peripheral area 110b may be electrically connected to the shared electrode 124 located in the active area 110a. However, the disclosure is not limited thereto. In other embodiments, the peripheral trace 130 and the shared electrode 124 located in the active area 110a may be electrically insulated from each other, and have different signals.

The pixel array substrate 100 includes a plurality of first patterns 140, disposed in the peripheral area 110b of the substrate 110. Each of the first patterns 140 includes a first trunk portion 142 and at least one first branch portion 144. The at least one first branch portion 144 is crossed with the first trunk portion 142. In the present embodiment, the first trunk portion 142 extends in a direction of being crossed with the edge 100c of the substrate 100, and the first pattern 140 includes a plurality of first branch portions 144 crossed with and insulated from the first trunk portion 142.

In the present embodiment, the first pattern 140 overlaps a sealant 160. When the pixel array substrate 100 and an opposite substrate (not shown) are combined to form a display panel (not shown), the sealant 160, the pixel array substrate 100, and the opposite substrate jointly surround a display medium (for example, but not limited to a liquid crystal). In the present embodiment, the plurality of first branch portions 144 of the first pattern 140 may define a plurality of distances between the edge 160c of the sealant 160 and the edge 110c of the substrate 110. Functions of the plurality of first branch portions 144 of the first pattern 140 are similar to a scale, and an offset degree of the sealant 160 can be directly discriminated and read by using the plurality of first branch portions 144 of the first pattern 140.

In addition, in the present embodiment, the first trunk portion 142 of the first pattern 140 may be electrically connected to the peripheral trace 130. However, the disclosure is not limited thereto. In other embodiments, the first trunk portion 142 of the first pattern 140 may alternatively be electrically connected to the signal line DL of the pixel structure 120. This is to be described below in the following paragraphs in combination with other figures.

In the present embodiment, the signal line DL of each of pixel structures 120 has an extension portion DLa extending to the peripheral area 110b, and each of the first patterns 140 is disposed between a plurality of extension portions DLa of two adjacent signal lines DL of the plurality of pixel structures 120. Because the first patterns 140 is disposed between the plurality of extension portions DLa of the two adjacent signal lines DL, in addition to serving as a tool to evaluate the offset degree of the sealant 160, the first patterns 140 may further serve as a bucking electrode between the two adjacent signal lines DL, to further improve electrical properties of the pixel array substrate 100.

In the present embodiment, the pixel array substrate 100 may optionally include a plurality of second patterns 150. The second pattern 150 is disposed in the peripheral area 110b of the substrate 110, where graphs of the second patterns 150 are different from graphs of the first patterns. Each of the second patterns 150 includes a second trunk portion 152 and a second branch portion 154, where the second branch portion 154 is crossed with the second trunk portion 152. For example, in the present embodiment, the second trunk portion 152 of the second pattern 150 may be a long line segment, and the second branch portion 154 may be a block pattern overlapping the long line segment. However, the disclosure is not limited thereto. In other embodiments, the second pattern 150 may alternatively be designed as other patterns.

In the present embodiment, the second pattern 150 is used as an alignment mark for coating the sealant 160. A machine can coat the sealant 160 more accurately through disposition of the second pattern 150. In addition, in the present embodiment, the second trunk portion 152 of the second pattern 150 may be electrically connected to the peripheral trace 130. However, the disclosure is not limited thereto. In other embodiments, the second trunk portion 152 of the second pattern 150 may alternatively be electrically connected to the signal line DL of the pixel structure 120. This is to be described below in the following paragraphs in combination with other figures.

In the present embodiment, the signal line DL of each of pixel structures 120 has an extension portion DLa extending to the peripheral area 110b, and each of the second patterns 150 is disposed between a plurality of extension portions DLa of two adjacent signal lines DL of the plurality of pixel structures 120. Because the second pattern 150 is disposed between the plurality of extension portions DLa of the two adjacent signal lines DL, in addition to serving as the alignment mark for coating the sealant 160, the second patterns 150 may further serve as a bucking electrode between the two adjacent signal lines DL, to further improve electrical properties of the pixel array substrate 100.

Figure 3:
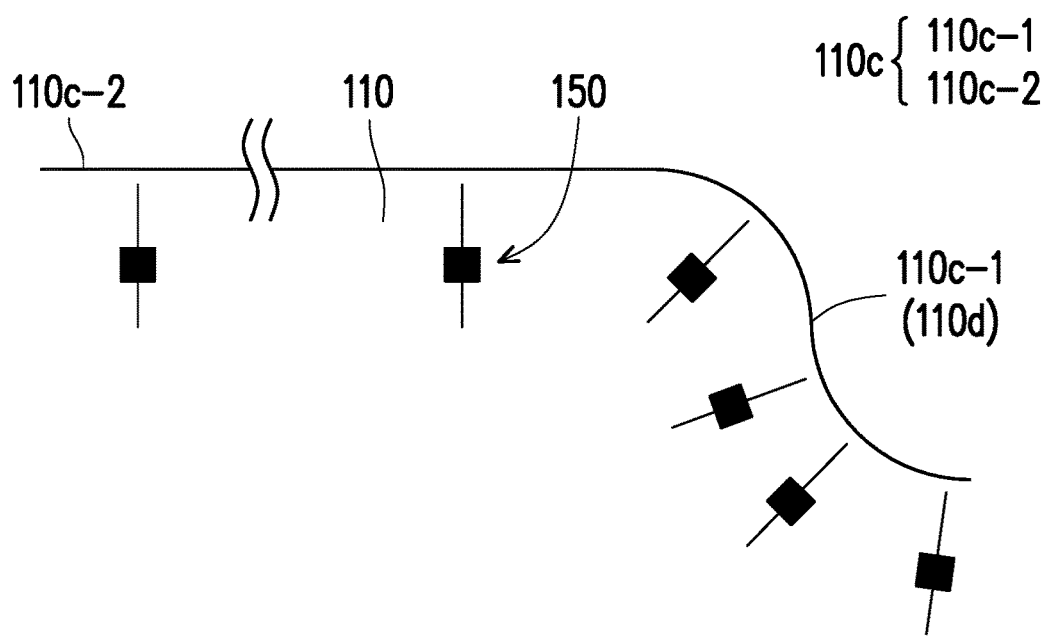
FIG. 3 shows an edge 100c of a substrate 110 and a plurality of second patterns 150 according to an embodiment of the disclosure.

FIG. 3 shows an edge 100c of a substrate 110 and a plurality of second patterns 150 according to an embodiment of the disclosure. Referring to FIG. 1 and FIG. 3, in the present embodiment, the edge 110c of the substrate 110 has a first segment 110c-1 and a second segment 110c-2, where a curvature radius of the first segment 110c-1 is less than a curvature radius of the second segment 110c-2, and a disposition density of the plurality of second patterns 150 beside the first segment 110c-1 is greater than a disposition density of the plurality of second patterns 150 beside the second segment 110c-2. In other words, a relatively large quantity of second patterns 150 may be disposed in a position in which the curvature radius of the edge 110c of the substrate 110 changes greatly, to help a machine coat the sealant 160 accurately in the position in which the curvature radius changes greatly based on a plurality of second patterns 150 that are relatively dense.

Figure 4:
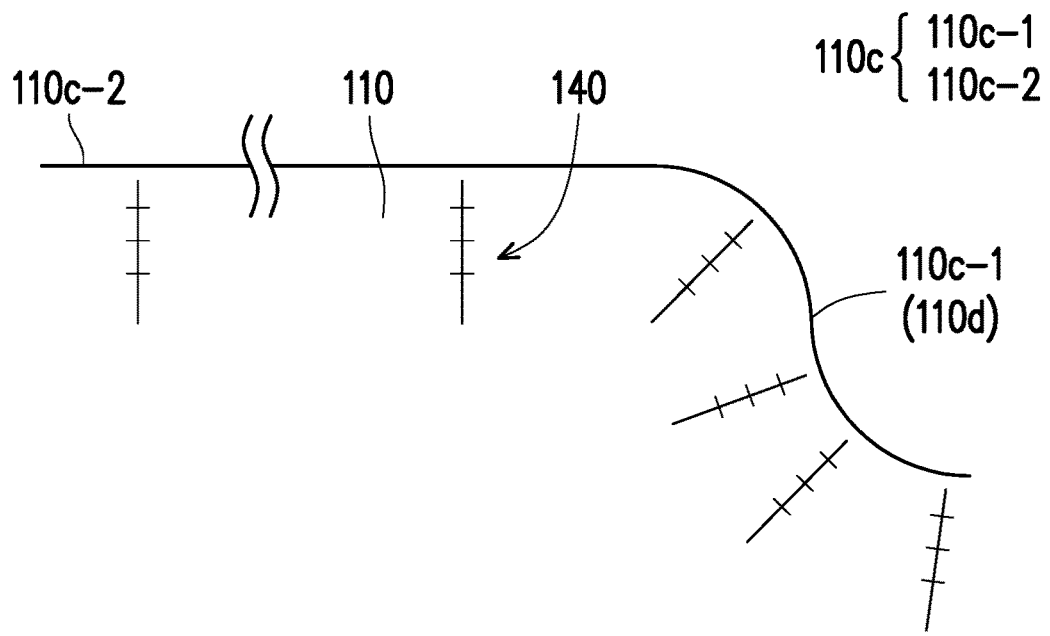
FIG. 4 shows an edge 100c of a substrate 110 and a plurality of second patterns 150 according to an embodiment of the disclosure.

FIG. 4 shows an edge 100c of a substrate 110 and a plurality of second patterns 150 according to an embodiment of the disclosure. Referring to FIG. 1 and FIG. 4, in the present embodiment, the edge 110c of the substrate 110 has a first segment 110c-1 and a second segment 110c-2, where a curvature radius of the first segment 110c-1 is less than a curvature radius of the second segment 110c-2, and a disposition density of the plurality of first patterns 140 beside the first segment 110c-1 is greater than a disposition density of the plurality of first patterns 140 beside the second segment 110c-2. In other words, a relatively large quantity of first patterns 140 may be disposed in a position in which the curvature radius of the edge 110c of the substrate 110 changes greatly, so as to monitor an offset degree of the sealant 160.

Referring to FIG. 2, in the present embodiment, the first trunk portion 142 of each of the first patterns 140 and the peripheral trace 130 optionally belong to a same film layer, and are directly connected. The first trunk portion 142 of each of the first patterns 140 and the first branch portion 144 optionally belong to a same film layer. The second trunk portion 142 of each of the second patterns 150 and the peripheral trace 130 optionally belong to a same film layer, and are directly connected. The second trunk portion 152 of each of the second patterns 150 and the second branch portion 154 optionally belong to a same film layer. However, the disclosure is not limited thereto.

It should be noted that, the following embodiments follow the component labels and partial content of the foregoing embodiments, where a same label is used to represent a same or similar component, and descriptions of the same technical content are omitted. For descriptions of the omitted part, refer to the foregoing embodiments, and the descriptions thereof are no longer repeated in the following embodiments.

Figure 5:
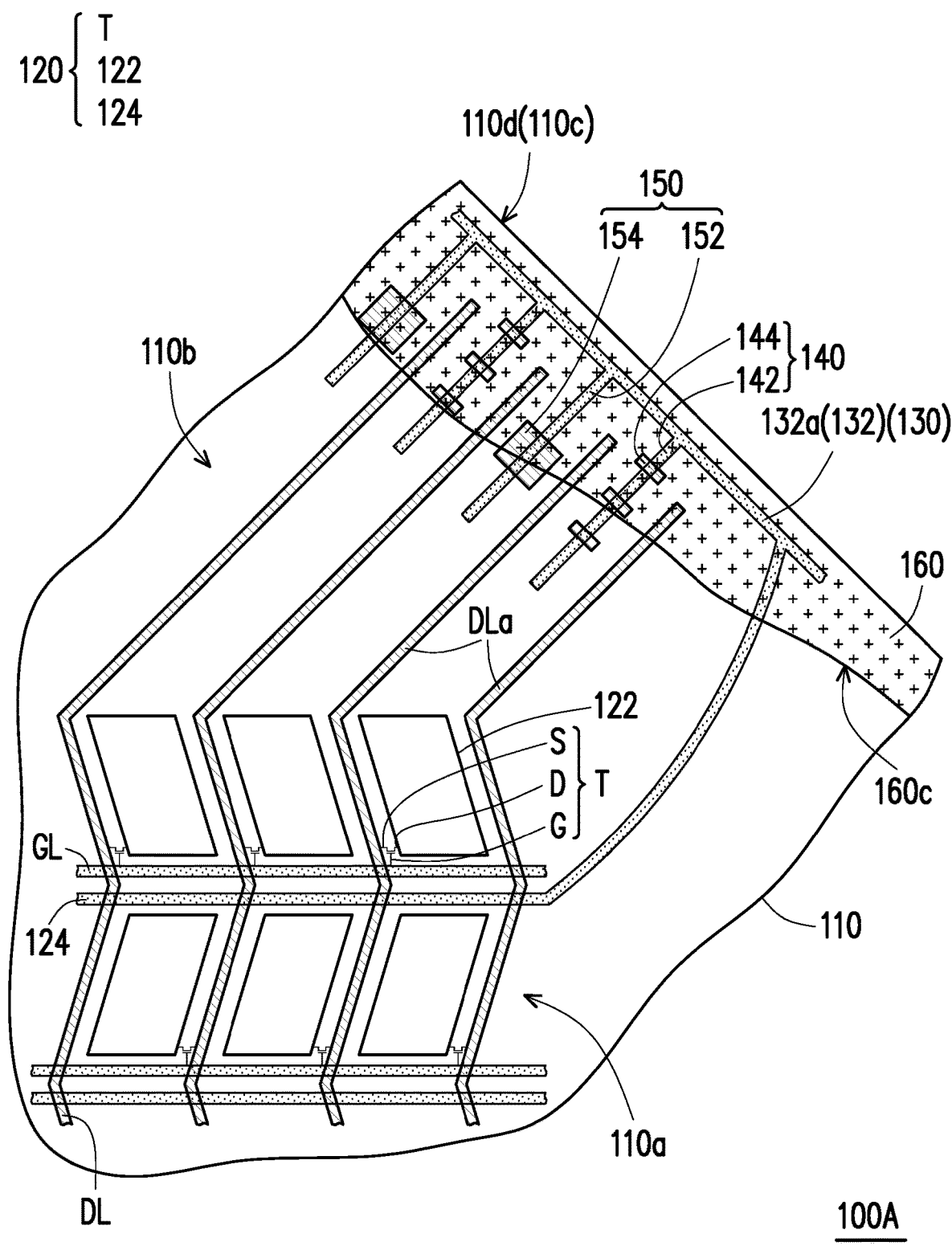
FIG. 5 is a partial enlarged view of a pixel array substrate 100A according to another embodiment of the disclosure.

FIG. 5 is a partial enlarged view of a pixel array substrate 100A according to another embodiment of the disclosure.

The pixel array substrate 100A in FIG. 5 is similar to the pixel array substrate 100 in FIG. 5. A difference between the pixel array substrate 100A and the pixel array substrate 100 lies in that: in the embodiment of FIG. 5, the first trunk portion 142 of each of the first patterns 140 and the first branch portion 144 belong to different film layers. To be specific, an insulation layer (not shown) may be sandwiched between the first trunk portion 142 and the first branch portion 144. The second trunk portion 152 of each of the second patterns and the second branch portion 154 belong to different film layers. To be specific, an insulation layer (not shown) may be sandwiched between the second trunk portion 152 and the second branch portion 154.

Figure 6:
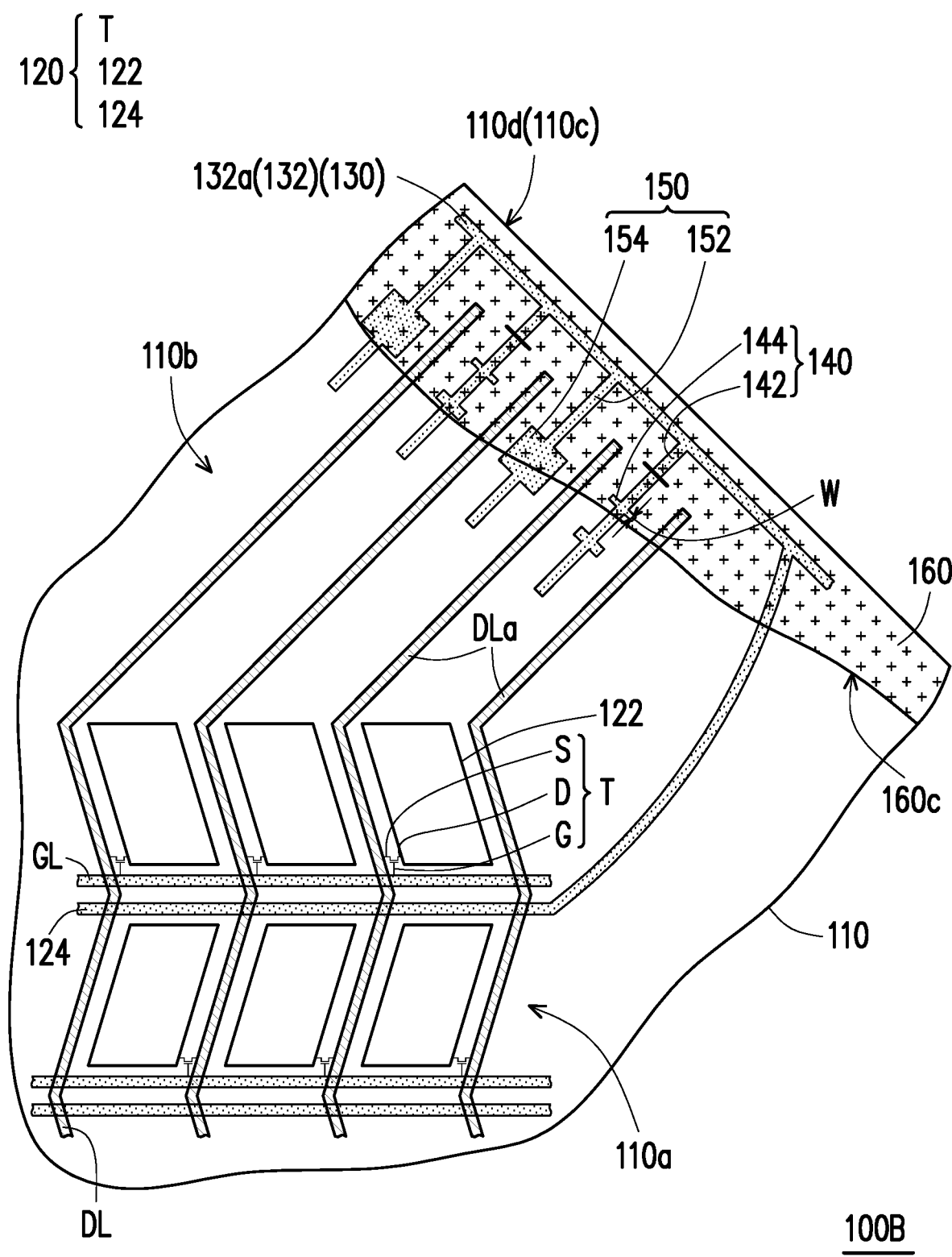
FIG. 6 is a partial enlarged view of a pixel array substrate 100B according to still another embodiment of the disclosure.

FIG. 6 is a partial enlarged view of a pixel array substrate 100B according to still another embodiment of the disclosure.

The pixel array substrate 100B in FIG. 6 is similar to the pixel array substrate 100 in FIG. 2. A difference between the pixel array substrate 100B and the pixel array substrate 100 lies in that: in the embodiment of FIG. 6, the substrate 110 has an edge 110c, distances between a plurality of first branch portions 144 of the first pattern 140 and the edge 110c are different, and graphs of the plurality of first branch portions 144 are different. For example, in the present embodiment, a line width W of the first branch portion 144 may vary (for example, but not limited to, increasing) as the first branch portion 144 is away from the edge 110c of the substrate 110. The plurality of first branch portions 144 of the first pattern 140 with different graphs help quickly discriminated and read an offset degree of the sealant 160.

Figure 7:
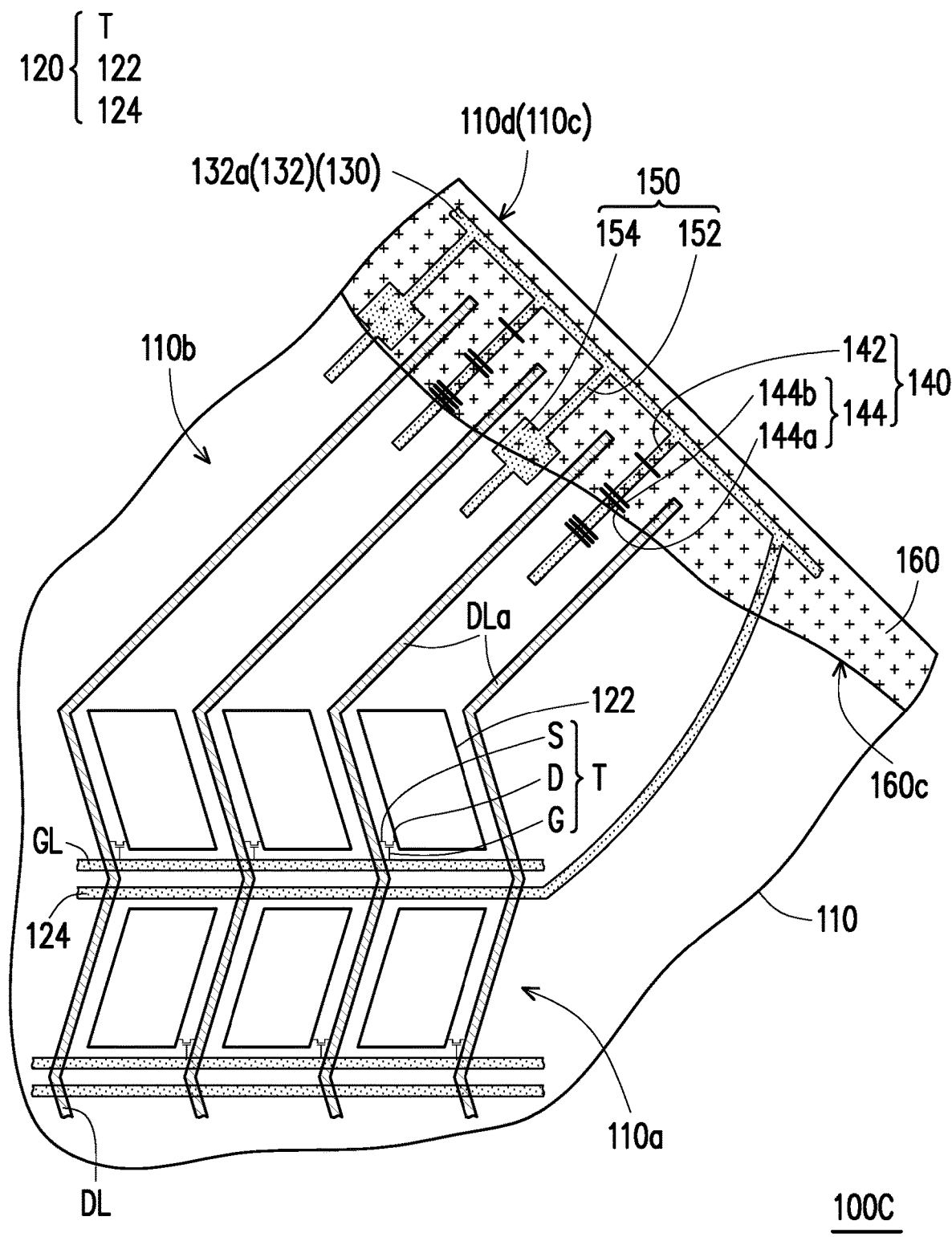
FIG. 7 is a partial enlarged view of a pixel array substrate 100C according to yet another embodiment of the disclosure.

FIG. 7 is a partial enlarged view of a pixel array substrate 100C according to yet another embodiment of the disclosure.

The pixel array substrate 100C in FIG. 7 is similar to the pixel array substrate 100 in FIG. 2. A difference between the pixel array substrate 100C and the pixel array substrate 100 lies in that: in the embodiment of FIG. 7, the substrate 110 has an edge 110c, distances between a plurality of first branch portions 144 of the first pattern 140 and the edge 110c are different, and graphs of the plurality of first branch portions 144 are different. For example, in the present embodiment, each of the first branch portions 144 of the first pattern 140 includes at least one thin line 144a, and a quantity of the thin lines 144a included in the first branch portion 144 may increase as the first branch portion 144 is away from the edge 110c of the substrate 110. However, the disclosure is not limited thereto.

Figure 8:
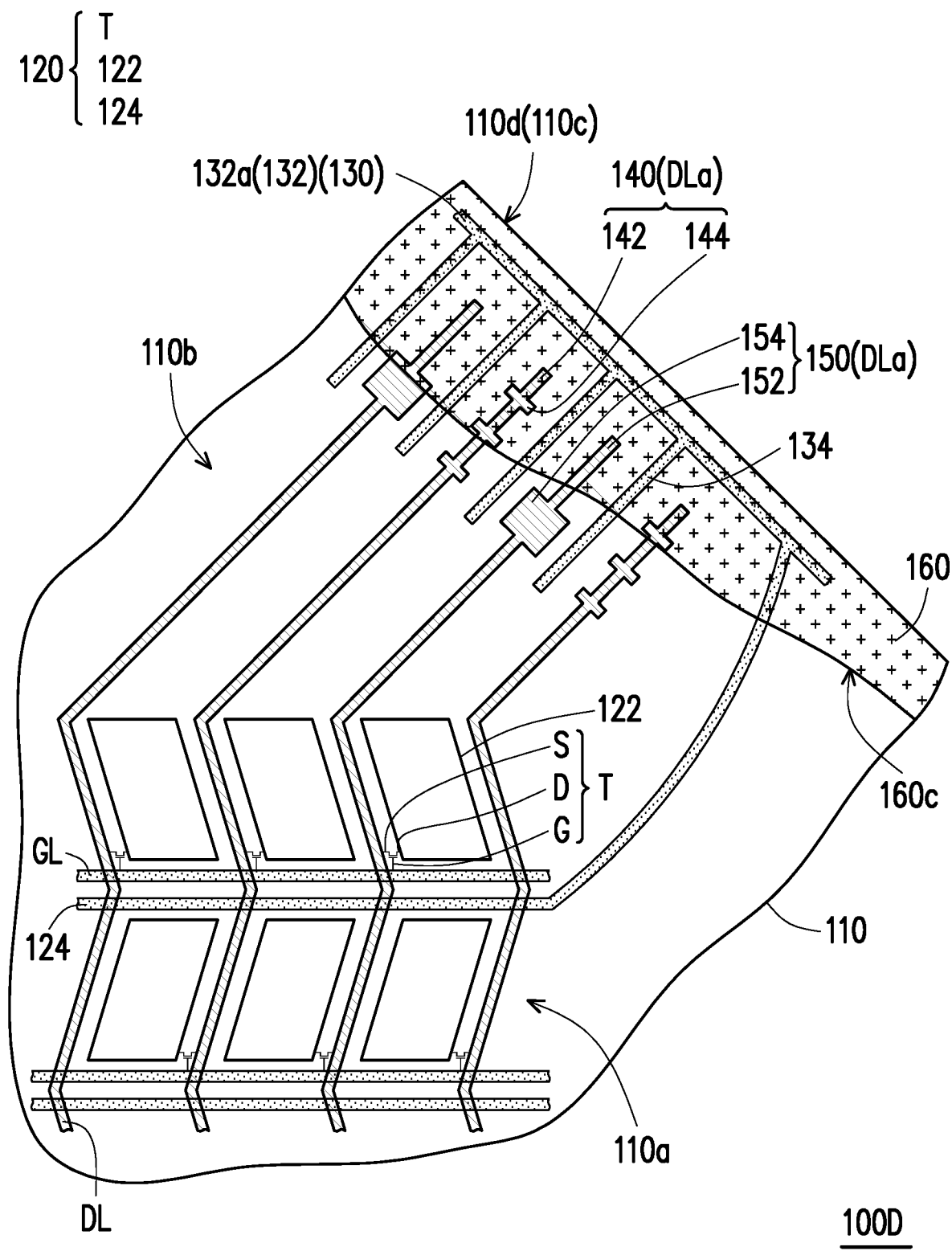
FIG. 8 is a partial enlarged view of a pixel array substrate 100D according to an embodiment of the disclosure.

FIG. 8 is a partial enlarged view of a pixel array substrate 100D according to an embodiment of the disclosure.

Figure 9:
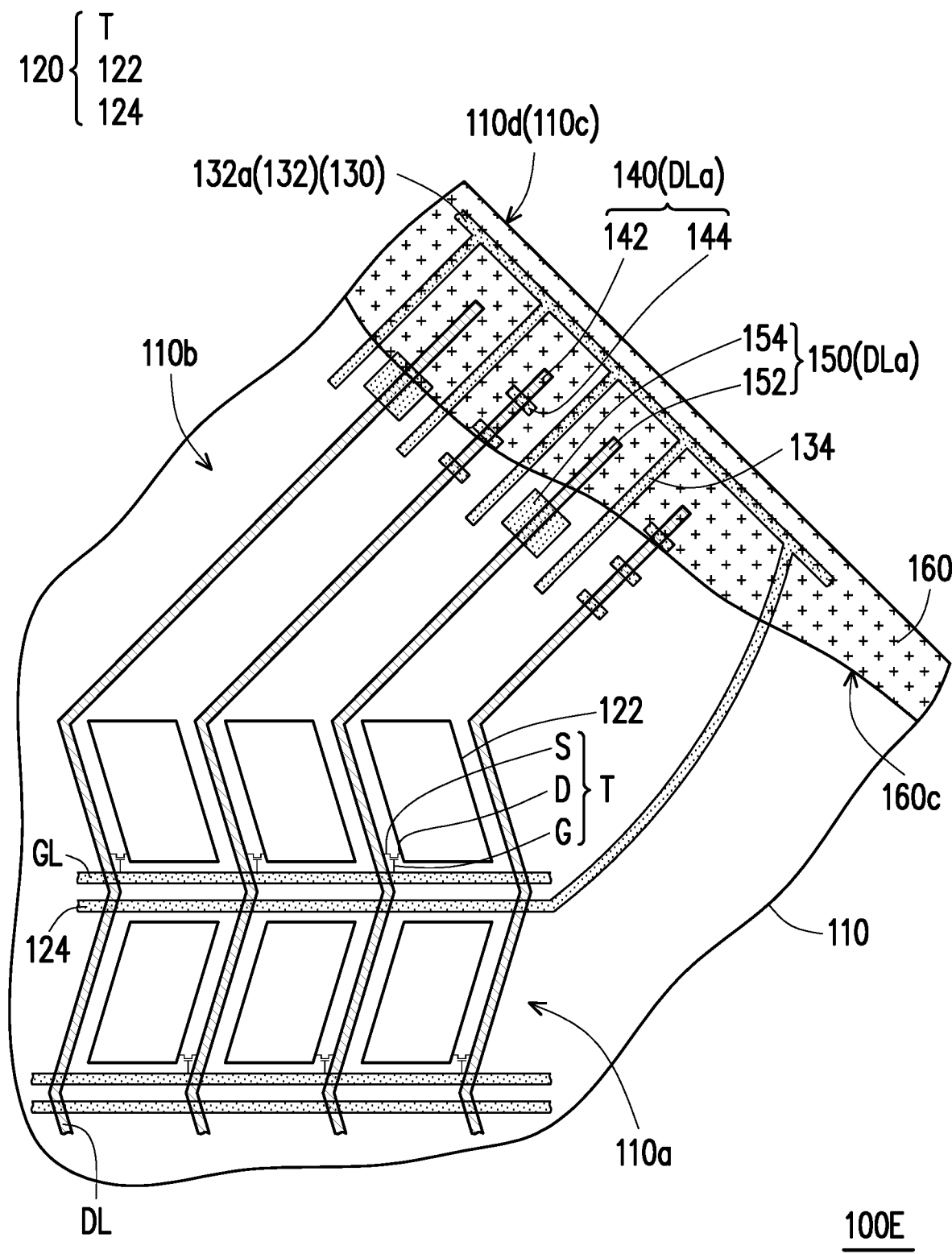
FIG. 9 is a partial enlarged view of a pixel array substrate 100E according to another embodiment of the disclosure.

FIG. 9 is a partial enlarged view of a pixel array substrate 100E according to another embodiment of the disclosure.

Figure 10:
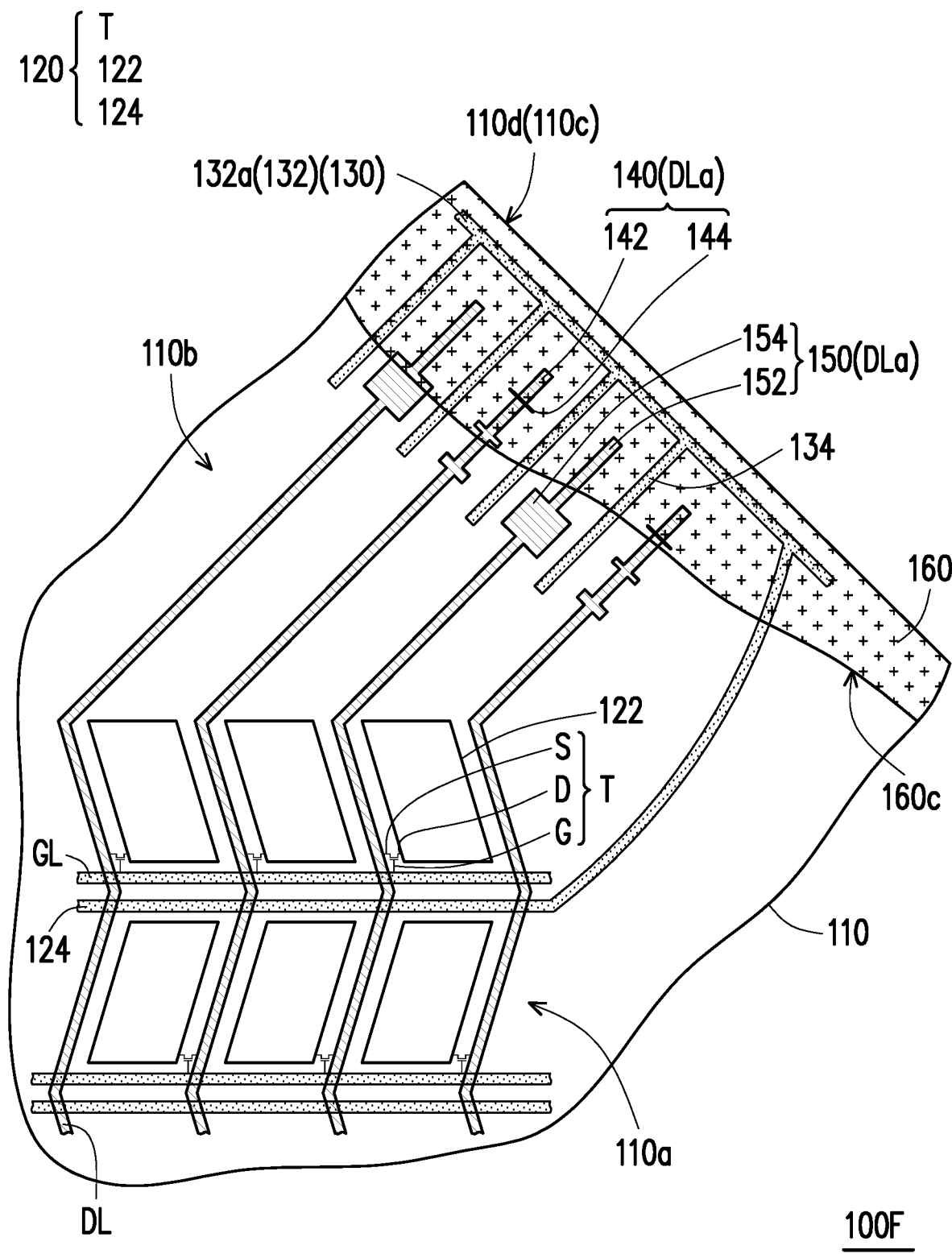
FIG. 10 is a partial enlarged view of a pixel array substrate 100F according to still another embodiment of the disclosure.

FIG. 10 is a partial enlarged view of a pixel array substrate 100F according to still another embodiment of the disclosure.

Figure 11:
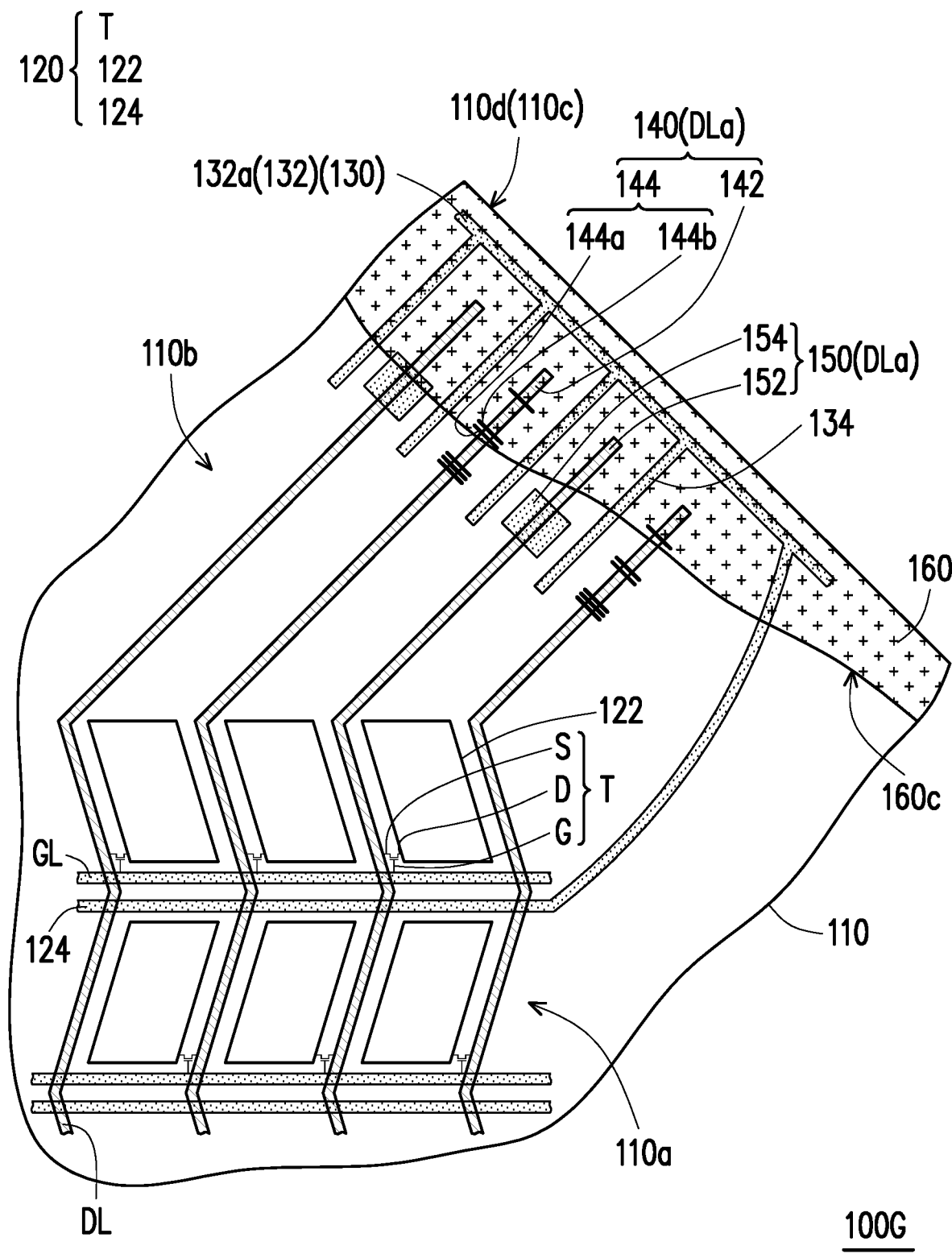
FIG. 11 is a partial enlarged view of a pixel array substrate 100G according to yet embodiment of the disclosure.

FIG. 11 is a partial enlarged view of a pixel array substrate 100G according to yet embodiment of the disclosure.

The pixel array substrate 100D in FIG. 8, the pixel array substrate 100E in FIG. 9, the pixel array substrate 100F in FIG. 10, and the pixel array substrate 100G in FIG. 11 are similar to the pixel array substrate 100 in FIG. 2, the pixel array substrate 100A in FIG. 5, the pixel array substrate 100B in FIG. 6, and the pixel array substrate 100C in FIG. 7 respectively. A difference between two similar pixel array substrates (namely, the pixel array substrate 100D and the pixel array substrate 100, the pixel array substrate 100E and the pixel array substrate 100A, the pixel array substrate 100F and the pixel array substrate 100B, or the pixel array substrate 100G and the pixel array substrate 100C) lies in that: in the embodiments of FIG. 8, FIG. 9, FIG. 10, and FIG. 11, each of first trunk portions 142 of the first pattern 140 is electrically connected to the signal line DL of the pixel structure 120. In addition, in the embodiments of FIG. 8, FIG. 9, FIG. 10, and FIG. 11, in addition to including the main portion 132 extending along the edge 110c of the substrate 110, the peripheral trace 130 further includes a plurality of branch portions 134 extending from the main portion 132 to the pixel structure 120. Each of the first patterns 140 electrically connected to the data line DL is located between two adjacent branch portions 134, and each of the second patterns 150 electrically connected to the data line DL is located between the two adjacent branch portions 134.

In other words, in the embodiments of FIG. 8, FIG. 9, FIG. 10, and FIG. 11, a plurality of first patterns 140 and a plurality of second patterns 150 may be considered as a plurality of data lines DL and a plurality of extension portions DLa, and the branch portion 134 of the peripheral trace 130 may serve as a bucking electrode between two adjacent signal lines DL, to further improve electrical properties of the pixel array substrates 100D, 100E, 100F, and 100G.

Figure 12:
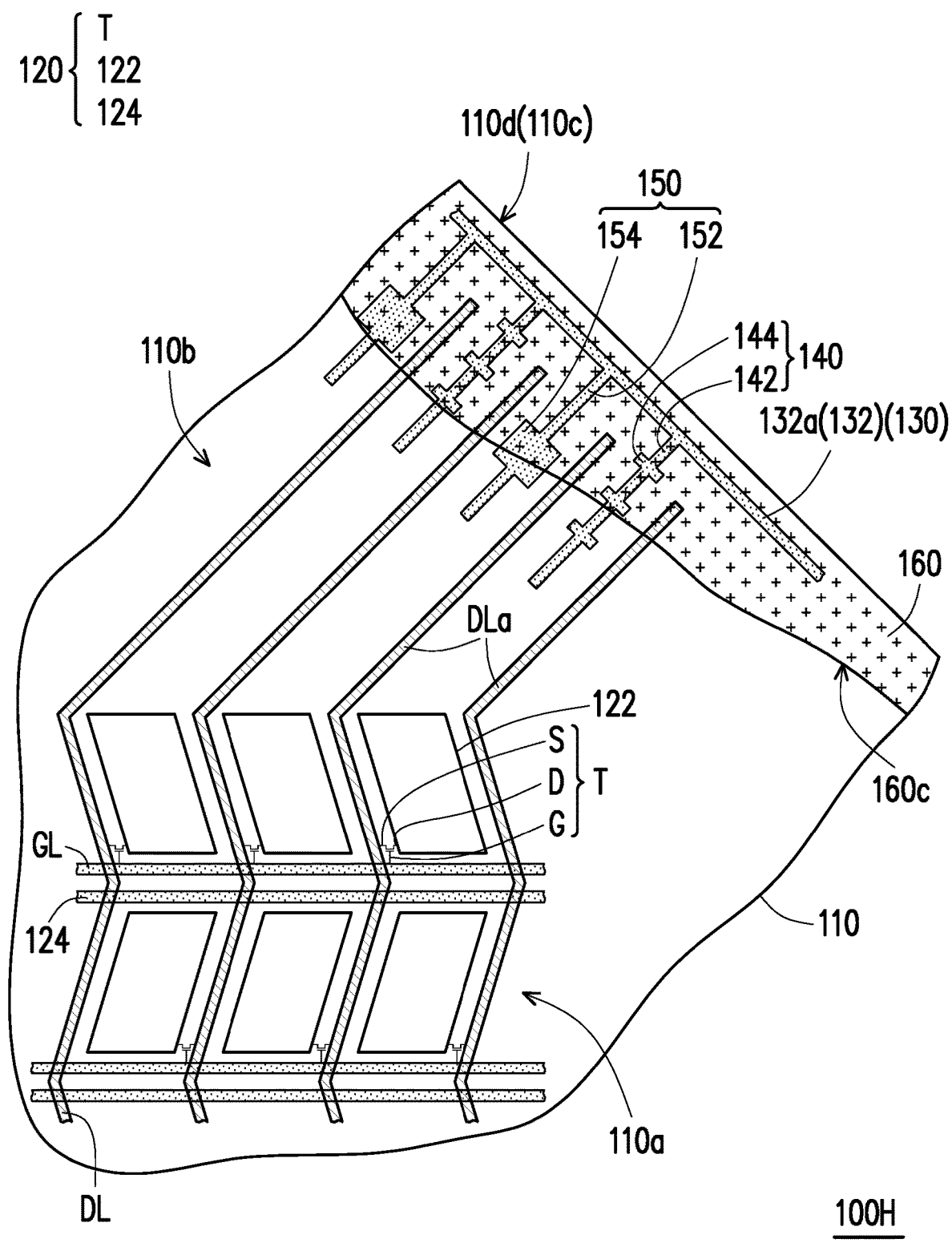
FIG. 12 is a partial enlarged view of a pixel array substrate 100H according to an embodiment of the disclosure.

FIG. 12 is a partial enlarged view of a pixel array substrate 100H according to an embodiment of the disclosure.

The pixel array substrate 100H in FIG. 12 is similar to the pixel array substrate 100 in FIG. 2. A difference between the pixel array substrate 100H and the pixel array substrate 100 lies in that: in the embodiment of FIG. 12, the peripheral trace 130 located in the peripheral area 110b and the shared electrode 124 located in the active area 110a may be electrically insulated from each other, and have different signals.

In addition, it should be noted that the foregoing pixel array substrates 100, 100A to 100H all include both the first pattern 140 and the second pattern 150. However, the disclosure is not limited thereto. According to other embodiments, for the foregoing pixel array substrates 100, 100A to 100H, the second pattern 150 may alternatively be omitted, and a function of an alignment mark of the second pattern 150 may be achieved by using the first pattern 140.

What is claimed is:

1. A pixel array substrate, comprising:
a substrate, having an active area and a peripheral area outside the active area;
a plurality of pixel structures, disposed in the active area of the substrate, wherein each of the pixel structures comprises a signal line, an active device electrically connected to the signal line and a pixel electrode electrically connected to the active device;
a peripheral trace, disposed in the peripheral area of the substrate; and
a plurality of first patterns, disposed in the peripheral area of the substrate, wherein each of the first patterns comprises:
 a first trunk portion, electrically connected to the peripheral trace, or electrically connected to the signal line of the pixel structure; and
 at least one first branch portion, crossed with the first trunk portion;
wherein at least one of the plurality of first patterns and a sealant are overlapped.

2. The pixel array substrate according to claim 1, wherein the first trunk portion of each of the first patterns is electrically connected to the peripheral trace, the signal line of each of the pixel structures has an extension portion extending to the peripheral area, and each of the first patterns is disposed between the plurality of extension portions of the two adjacent signal lines of the pixel structures.

3. The pixel array substrate according to claim 1, wherein the first trunk portion of each of the first patterns is electrically connected to the signal line of the pixel structure, the peripheral trace comprises a main portion extending along an edge of the substrate and a plurality of branch portions extending from the main portion to the pixel structures, and each of the first patterns is located between the two adjacent branch portions of the peripheral trace.

4. The pixel array substrate according to claim 1, wherein the first trunk portion of each of the first patterns and the at least one first branch portion belong to a same film layer.

5. The pixel array substrate according to claim 1, wherein the first trunk portion of each of the first patterns and the at least one first branch portion belong to different film layers.

6. The pixel array substrate according to claim 1, wherein the substrate has an edge, distances between the first branch portions of each of the first patterns and the edge are different, and graphs of the first branch portions are different.

7. The pixel array substrate according to claim 1, wherein an edge of the substrate has a first segment and a second segment, a curvature radius of the first segment is less than a curvature radius of the second segment, and a disposition density of the first patterns beside the first segment is greater than a disposition density of the first patterns beside the second segment.

8. The pixel array substrate according to claim 1, further comprising:
a plurality of second patterns, disposed in the peripheral area of the substrate, wherein graphs of the first patterns are different from graphs of the second patterns, and each of the second patterns comprises:
 a second trunk portion, electrically connected to the peripheral trace, or electrically connected to the signal line of the other pixel structure; and
 a second branch portion, crossed with the second trunk portion.

9. The pixel array substrate according to claim 8, wherein the second trunk portion of each of the second patterns is electrically connected to the peripheral trace, the signal line of each of the pixel structures has an extension portion extending to the peripheral area, and each of the second patterns is disposed between the plurality of extension portions of the two adjacent signal lines of the pixel structures.

10. The pixel array substrate according to claim 8, wherein the second trunk portion of each of the second patterns is electrically connected to the signal line of the other pixel structure, the peripheral trace comprises a main portion extending along an edge of the substrate and a plurality of branch portions extending from the main portion to the pixel structures, and each of the second patterns is located between the two adjacent branch portions of the peripheral trace.

11. The pixel array substrate according to claim 8, wherein an edge of the substrate has a first segment and a second segment, a curvature radius of the first segment is less than a curvature radius of the second segment, and a disposition density of the second patterns beside the first segment is greater than a disposition density of the second patterns beside the second segment.

12. A pixel array substrate, comprising:
- a substrate, having an active area, a peripheral area outside the active area, and an edge, wherein the edge of the substrate has a curve segment;
- a plurality of pixel structures, disposed in the active area of the substrate, wherein each of the pixel structures comprises a signal line, an active device electrically connected to the signal line and a pixel electrode electrically connected to the active device;
- a peripheral trace, disposed in the peripheral area of the substrate, and having a curve segment, wherein the curve segment of the peripheral trace is disposed corresponding to the curve segment of the substrate; and
- a plurality of first patterns, disposed in the peripheral area of the substrate, and arranged along the curve segment of the peripheral trace, wherein each of the first patterns comprises:
  - a first trunk portion, electrically connected to the peripheral trace, or electrically connected to the signal line of the pixel structure; and
  - at least one first branch portion, crossed with the first trunk portion;
- wherein at least one of the plurality of first patterns and a sealant are overlapped.

13. The pixel array substrate according to claim 12, wherein the first trunk portion of each of the first patterns is electrically connected to the peripheral trace, the signal line of each of the pixel structures has an extension portion extending to the peripheral area, and each of the first patterns is disposed between the plurality of extension portions of the two adjacent signal lines of the pixel structures.

14. The pixel array substrate according to claim 12, wherein the first trunk portion of each of the first patterns is electrically connected to the signal line of the pixel structure, the peripheral trace comprises a main portion extending along the edge of the substrate and a plurality of branch portions extending from the main portion to the pixel structures, and each of the first patterns is located between the two adjacent branch portions of the peripheral trace.

15. The pixel array substrate according to claim 12, wherein distances between the first branch portions of each of the first patterns and the edge of the substrate are different, and graphs of the first branch portions are different.

16. The pixel array substrate according to claim 12, wherein the edge of the substrate comprises a first segment and a second segment, a curvature radius of the first segment is less than a curvature radius of the second segment, and a disposition density of the first patterns beside the first segment is greater than a disposition density of the first patterns beside the second segment.

17. The pixel array substrate according to claim 12, further comprising:
- a plurality of second patterns, disposed in the peripheral area of the substrate, wherein graphs of the first patterns are different from graphs of the second patterns, and each of the second patterns comprises:
  - a second trunk portion, electrically connected to the peripheral trace, or electrically connected to the signal line of the other pixel structure; and
  - a second branch portion, crossed with the second trunk portion.

18. The pixel array substrate according to claim 17, wherein the second trunk portion of each of the second patterns is electrically connected to the peripheral trace, the signal line of each of the pixel structures has an extension portion extending to the peripheral area, and each of the second patterns is disposed between the plurality of extension portions of the two adjacent signal lines of the pixel structures.

19. The pixel array substrate according to claim 17, wherein the second trunk portion of each of the second patterns is electrically connected to the signal line of the other pixel structure, the peripheral trace comprises a main portion extending along the edge of the substrate and a plurality of branch portions extending from the main portion to the pixel structures, and each of the second patterns is located between the two adjacent branch portions of the peripheral trace.

20. The pixel array substrate according to claim 17, wherein the edge of the substrate has a first segment and a second segment, a curvature radius of the first segment is less than a curvature radius of the second segment, and a disposition density of the second patterns beside the first segment is greater than a disposition density of the second patterns beside the second segment.

* * * * *